United States Patent [19]

Erickson

[11] 3,979,695
[45] Sept. 7, 1976

[54] HIGH ORDER BEAM MODE RESONATOR

[75] Inventor: Clifford W. Erickson, Minnetonka, Minn.

[73] Assignee: Honeywell Inc., Minneapolis, Minn.

[22] Filed: Dec. 20, 1974

[21] Appl. No.: 534,996

[52] U.S. Cl.............................................. 331/94.5 C
[51] Int. Cl.²............................................. H01S 3/08
[58] Field of Search.................. 331/94.5; 356/106; 350/160, 161

[56] References Cited
UNITED STATES PATENTS

| | | |
|---|---|---|
| 3,466,566 | 9/1969 | Patel ............................ 331/94.5 C |
| 3,571,738 | 3/1971 | Gloge ............................ 331/94.5 |

*Primary Examiner*—William L. Sikes
*Attorney, Agent, or Firm*—Omund R. Dahle; David R. Fairbairn

[57] ABSTRACT

High order resonant beam modes are generated in an open resonant cavity. The cavity is formed by reflectors which are separated from one another along an axis. Wave energy is introduced into the resonant cavity at a position which is not on the axis.

16 Claims, 10 Drawing Figures

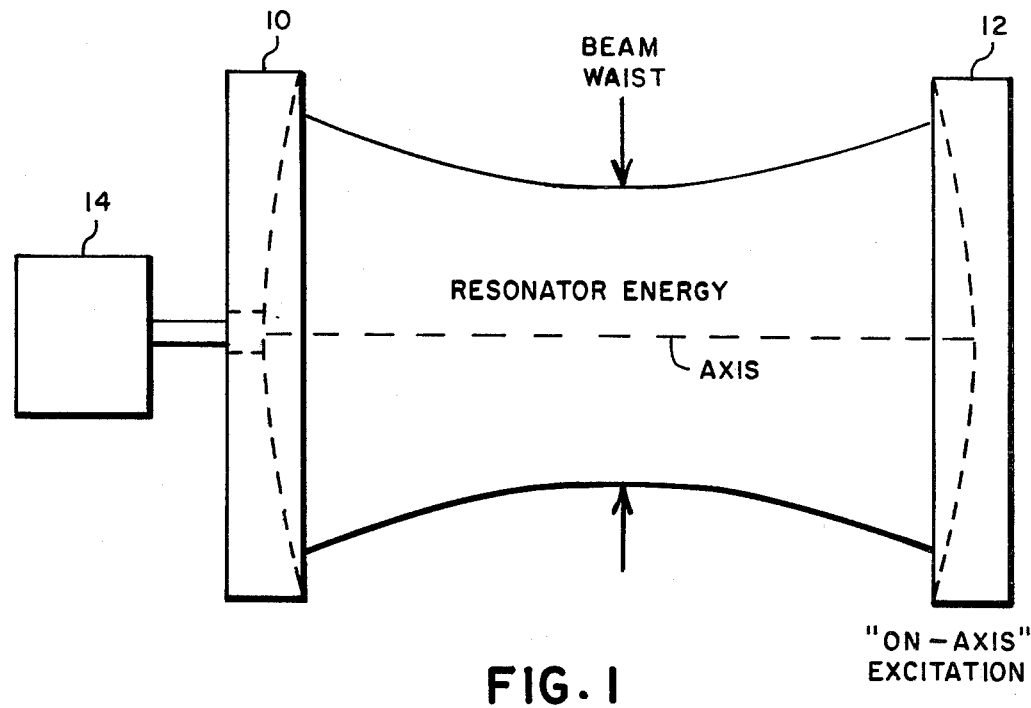
FIG. 1
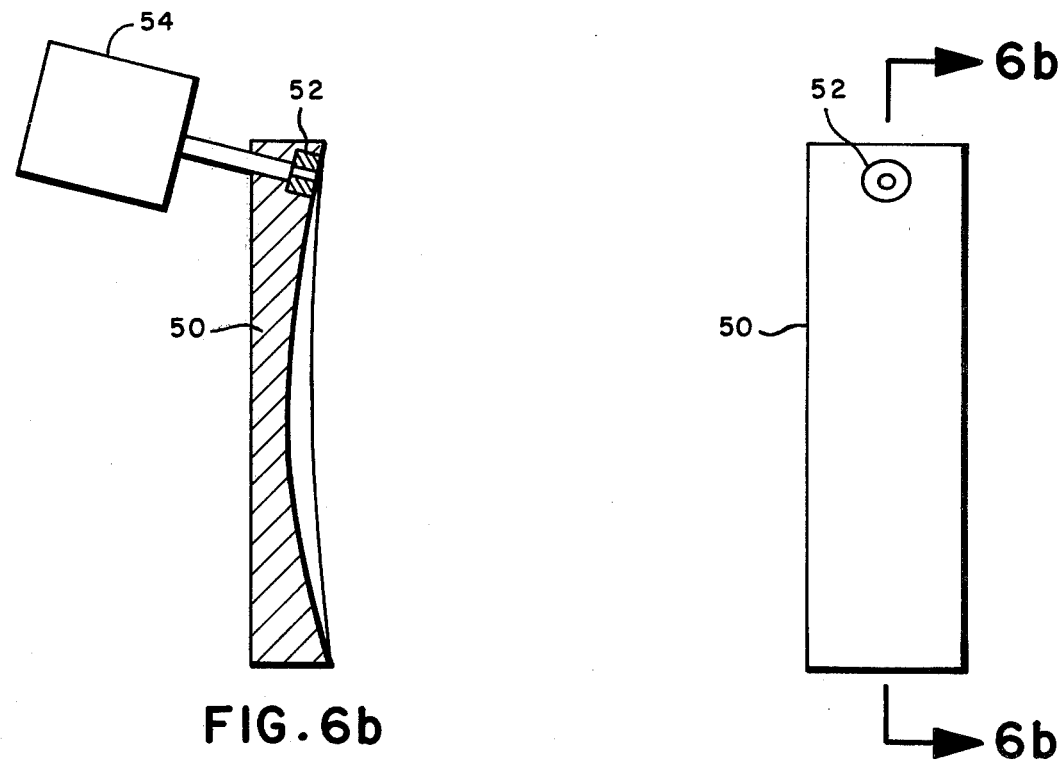
FIG. 6b
FIG. 6a

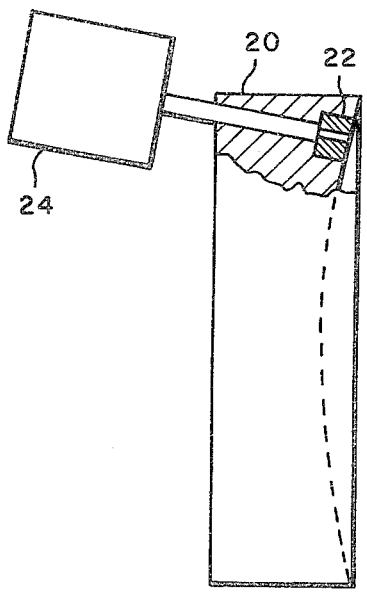
FIG. 3b
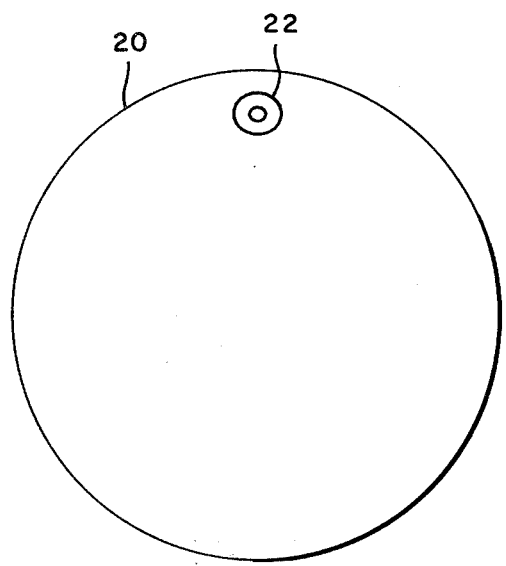
FIG. 3a
FIG. 2
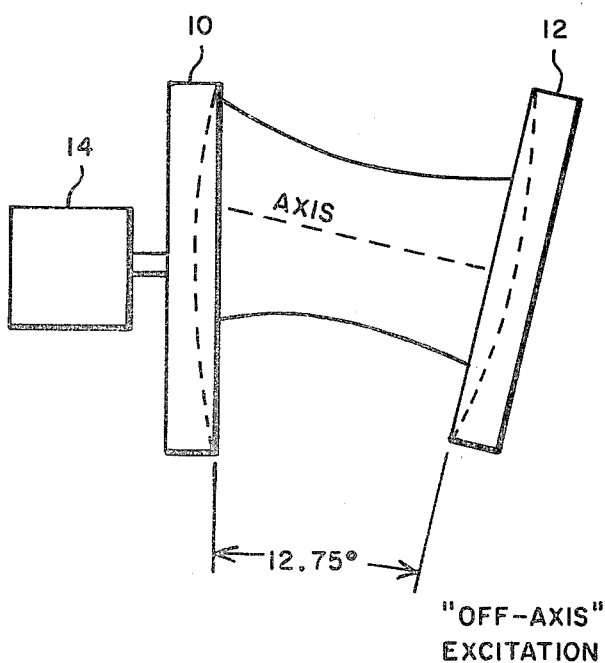
"OFF-AXIS" EXCITATION
FIG. 4
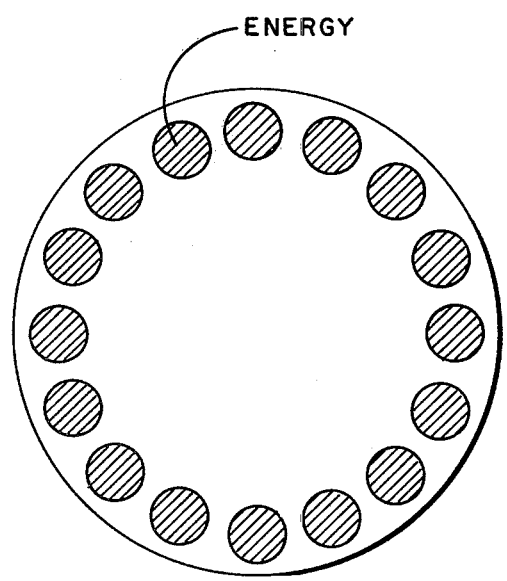

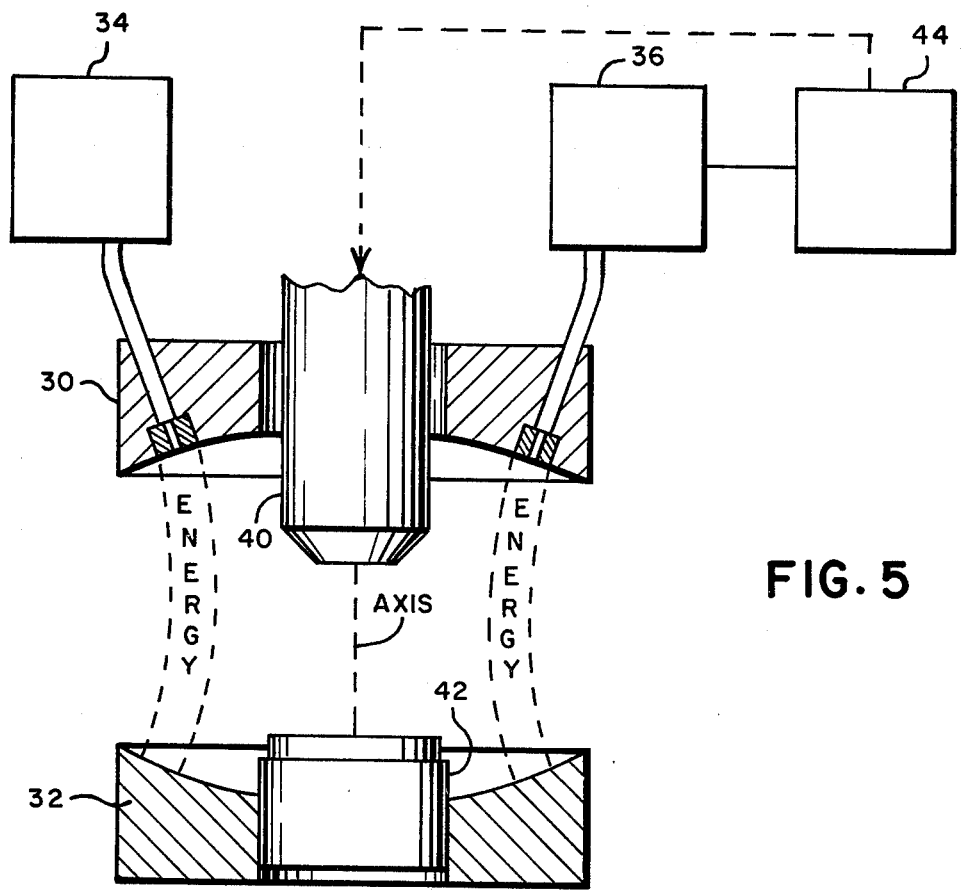
FIG. 5
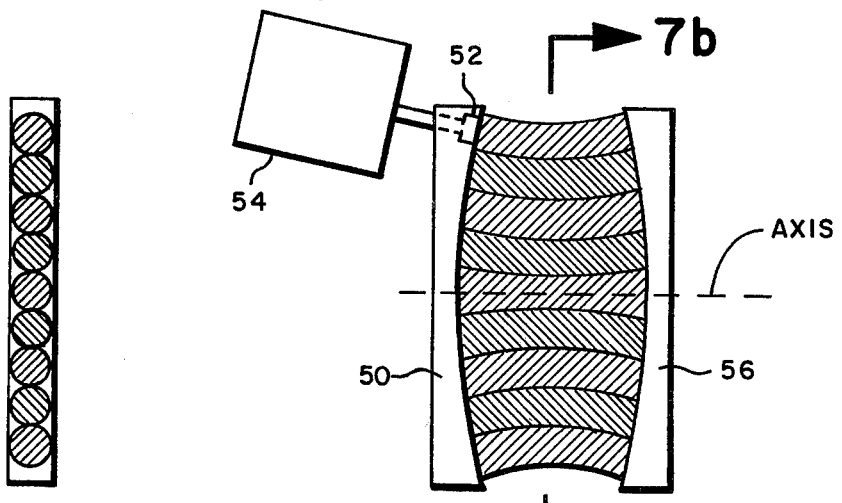
FIG. 7b
FIG. 7a

HIGH ORDER BEAM MODE RESONATOR

CROSS-REFERENCE TO CO-PENDING APPLICATIONS

Reference is made to my co-pending applications, entitled "Proximity Sensor" and "Acoustic Resonant Cavity", which were filed on even date with this application, and which are assigned to the same assignee as this application.

BACKGROUND OF THE INVENTION

The present invention relates to a beam resonator in which high order resonant beam modes are generated. Beam modes are so named because they are mathematically identical to the possible cross-sectional power levels of a laser beam, H. Kogelnik and T. Li, "Laser Beams and Resonators", Applied Optics, 5, 1550 – 1567 (October, 1966), or the so-called beam waveguide, G. Goubau and F. Schwering, "On the Guided Propagation of Electromagnetic Wave Beams", IRE Trans. on Antennas and Propagation, AP-9, 248 – 256 (May, 1961). The use of a Fabry-Perot structure as a laser resonator, along with its analogous relationship to the beam waveguide for transmission of very short wavelength microwave power, has provided the impetus for developing the electromagnetic theory of its operation. Measurements at microwave frequencies have often been used to verify the theory and analyze the effect of different parameters for a Fabry-Perot resonator.

A Fabry-Perot resonator is basically two mirrors positioned on a common axis and displaced from each other by a distance $d$. In systems with "large aperture", i.e., when a radial extent of the mirrors is large enough to reflect all but a negligible portion of beam energy, diffraction is neglected and a wave analysis of the resonator is carried out as follows.

A component of electric field, $u$, satisfied the scalar wave equation $$\nabla^2 u + k^2 u = 0 \qquad \text{(Equation 1)}$$

where $k = 2\pi/\lambda$ is the propagation constant. Since energy is traveling back and forth in a primarily axial direction solutions of the form $$u = \psi(r,\theta,z)e^{-jkz} \qquad \text{(cylindrical coordinates)}$$

or $$u = \psi(x,y,z)e^{-jkz} \qquad \text{(Equation 2) (cartesian coordinates)}$$

are substituted into Equation 1 where $e^{-jkz}$ is a plane wave in the $z$ direction and $\psi$ represents the difference between the beam in the cavity and a plane wave.

In the laser and beam waveguide technologies, the goal is to suppress high order modes, since they have a greater spatial extent and hence greater loss. Although observation of modes as high as $TEM_{07}$ have been reported in the laser literature, they are not usually welcome in laser or beam waveguide technology.

In my previously mentioned co-pending patent application entitled "Proximity Sensor", I utilize perturbation of a resonant beam mode as the sensing mechanism. The beam mode resonator is chosen to resonate in a mode whose geometry coincides with a desired shape of an energy curtain. The presence of an object is inferred from its perturbing effects on the resonance parameters of the cavity.

In my proximity sensor, it is precisely the greater spatial extent of higher order beam modes which is exploited. Preferred embodiments of my proximity sensor utilize high order beam modes which form a cylindrical annular energy curtain or form an essentially planar energy curtain.

SUMMARY OF THE INVENTION

The beam mode resonator of the present invention comprises first and second reflector means and energy source means. The first and second reflector means are separated from one another along an axis. The energy source means introduces wave energy into the resonant cavity formed by the first and second reflector means at a position spaced from the axis.

BRIEF DESCRIPTION OF THE DRAWING

FIG. 1 shows a resonant cavity in which energy is introduced "on-axis".

FIG. 2 shows a resonant cavity in which "off-axis" excitation is achieved by tilting one reflector with respect to the other reflector.

FIGS. 3a and 3b show front and side views, respectively, of a circular reflector for producing cylindrical annular resonant beam modes.

FIG. 4 shows the energy distribution of a resonant cylindrical annular beam mode produced by the apparatus of FIGS. 3a and 3b.

FIG. 5 shows a partial cross-sectional view of machine operator safety apparatus utilizing a cylindrical annular resonant mode.

FIGS. 6a and 6b show front and cross-sectional side views, respectively, of a rectangular reflector for use in another embodiment of the present invention.

FIGS. 7a and 7b show the energy distribution of a resonant rectangular beam mode formed with rectangular reflectors of the type shown in FIGS. 6a and 6b.

DETAILED DESCRIPTION OF THE PREFERRED EMBODIMENTS

The present invention is a beam mode resonator for generating high order beam modes. The particular beam modes generated by the present invention have particular application to proximity sensors of the type described in my co-pending patent application entitled "Proximity Sensor". Other applications of the present invention, however, are also possible.

In the present invention, energy is introduced to a beam resonant cavity at a position not on the axis. In order to appreciate the advantages of the off-axis excitation of the present invention, however, it is first necessary to study "on-axis" excitation.

FIG. 1 shows a diagrammatic representation of a beam cavity resonator having on-axis excitation. The resonant cavity is formed by reflectors 10 and 12, which are two concave curved surfaces facing one another and separated from one another along an axis. Energy source 14 provides energy into the cavity formed by reflectors 10 and 12. As shown in FIG. 1, the wave energy is supplied to the resonant cavity through a hole in one of the reflectors.

In general, a resonant cavity resonates in many modes. Each mode is characterized by a certain geometric distribution of energy and a certain resonant frequency, the so-called eigenfunction and eigenvalue, respectively, which comprise a possible solution to the wave equation. In principle, any arbitrary distribution of energy is possible by combining the individual modes in a suitable way. In practice, however, it is difficult to excite the cavity with just the right amount of each mode. For that reason, the preferred embodiments of the present invention generate a single mode of resonance with a desired geometrical shape.

When, as in FIG. 1, the reflectors of the resonant cavity are circular, the distribution of energy between the reflectors can be expressed approximately as $$(2r^2/w^2)^l [L_p^l(2r^2/w^2)]^2 (w_0^2/w^2) [e^{-2r^2/w^2}]\cos^2 l\phi \quad \text{(Equation 3)}$$

where $r$ is the radius, $\phi$ is the azimuthal angle of the cylindrical coordinate system, $w$ is a length parameter depending on the reflector geometry and axial position between the reflectors, and $w_0$ is the value of $w$ at the beam waist. The integers $p$ and $l$ determine the particular mode, which is denoted as $TEM_p l$. $L_p^l$ is the generalized Laguerre polynomial.

When on-axis excitation is used, the beam modes with zero energy on the axis ($l \neq 0$) are not excited. In certain applications, however, it is desirable to generate beam modes with zero energy on the axis. One example is the cylindrical annular beam mode which is used in my co-pending patent application entitled "Proximity Sensor".

The feasibility of exciting beam modes with no energy on the axis was demonstrated initially by simply tilting one reflector with respect to the other, as shown in FIG. 2. Since FIG. 2 is similar to FIG. 1, similar numerals have been used to designate similar elements. The tilting of reflector 12 with respect to reflector 10 created a new axis which did not pass through the coupling opening (or iris) in reflector 10.

Two effects were observed which distinguished the off-axis excitation of FIG. 2 from the on-axis excitation of FIG. 1. First, the effective diameter of the reflectors was reduced by approximately one-half, since the coupling opening was near the edge of the mode in FIG. 2. The highest possible mode in this configuration, therefore, was lower than in the on-axis case.

Second, several modes were resonant at the same frequency. From the resonance condition, $$f = \frac{c}{2d}[q + \frac{2}{\pi}(2p+l+1) \tan^{-1}\left(\frac{ad}{2}\right)] \quad \text{(Equation 4)}$$

where $q$ = axial mode number, and $$a = \lambda/\pi w$$

it is seen that if $l$ is not equal to zero, a change $\Delta l = \pm 2$ and $\Delta p = \mp 1$ results in the same resonant frequency. The mode which is of interest, however, namely $p = l$, $l = l$ max consistent with mirror geometry, has a smaller radial extent than the mode $p = l$, $l = l$ max $^{-2}$. Thus, when the desired mode just fits on the mirror, the competing modes "spill over" and because of this loss they are not excited to any appreciable extent.

The resulting beam mode has a cylindrical annular distribution with essentially zero energy on the axis. In the case of a cylindrical annular resonant mode, $p = 0$. In this case, Equation 3 is simplified since $L_0^l = 1$. Equation 3 then becomes $$(2r^2/w^2)^l (w_0^2/w^2) [e^{-2r^2/w^2}] \cos^2 l\phi \quad \text{(Equation 5)}$$

Although it is possible to generate cylindrical annular beam modes by tilting one reflector with respect to the other, this does have the disadvantage of reducing the effective diameter of the reflectors. FIGS. 3a and 3b show front and side views of a circular reflector which can be used to generate cylindrical annular resonant modes. When the reflector of FIGS. 3a and 3b is used as one reflector of the resonant cavity, it is not necessary to tilt one reflector with respect to the other.

In FIGS. 3a and 3b, reflector 20 is circular with an essentially spherical surface. Input iris 22 couples energy from energy source 24 into the resonant cavity. Input iris 22 is not located at the center of reflector 20, but rather is located near the periphery. The energy is introduced into the resonant cavity, therefore, at a location not on the axis defined by a line connecting the centers of curvature of the two reflectors.

As shown in FIGS. 3a and 3b, reflector 20 has a curved surface. Although plane reflectors can also be used, experiments have shown that reflector alignment becomes very critical, which is a disadvantage for most applications. When the reflectors have spherical surfaces, alignment is considerably less critical. The preferred reflector surface for the present invention, therefore, is curved. The most preferred surface shape is a spherical surface.

The spacing and shape of the reflectors and the wavelength of the energy supplied by energy source 24 determines the particular spatial distribution of the resonant energy within the resonant cavity. The preferred wavelength of wave energy in the present invention is between about 0.1 mm and about 10 cm. The wave energy may be electromagnetic energy or acoustic energy. The generation of resonant beam modes with acoustic energy is further described in my co-pending patent application entitled "Acoustic Resonant Cavity". Acoustic energy has an important economic advantage over electromagnetic energy in producing resonant beam modes: a given wavelength can be produced with acoustic waves at a much lower frequency than with electromagnetic waves, due to the lower speed of propagation of acoustic waves. At present, the cost of generating electromagnetic waves having a wavelength shorter than three cm precludes their use in many commercial applications.

In this specification, the beam modes generated are designated as "TEM" modes. Although acoustic waves are longitudinal, and not transverse, they obey the same differential equation and, in this case, satisfy the same boundary conditions as do electromagnetic waves. The mathematical form of the acoustic solution, therefore, is identical to that of the electromagnetic one. The same TEM designation, therefore, is used for both the electromagnetic and the acoustic beam modes. It should be understood that this is not a description of the physical nature of the wave, but rather is the use, for convenience, of designations which are already well known in the laser and microwave resonator art.

It is known from laser and beam waveguide technology that the axial spacing of two reflectors can be as large as, but not greater than, twice the radius of curvature of the reflectors and stable resonance will still be achieved. It has been found, however, that the beam waist becomes very narrow at larger spacing. In certain applications, such as the proximity sensor described in my co-pending patent application entitled "Proximity Sensor", it is desirable to have the acoustic beam have a rather large beam waist. In this case, it has been found that the preferred ratio R/d of the radius of curvature R and the spacing $d$ is between about 1.5 and about 2.0. Although R/d can range from 0.5 to infinity, less than about 1.5 causes the beam waist to be narrow and greater than about 2.0 results in a very close spacing of the reflectors.

FIG. 4 shows the energy distribution at the beam waist for the cylindrical annular $TEM_{08}$ mode. This energy distribution was generated in a resonant cavity with circular reflectors similar to the reflector shown in FIGS. 3a and 3b. As shown in FIG. 4, the energy is distributed in 2 $l$ energy bundles over an annulus whose radius is $w(\sqrt{l/2})$. In the proximity sensor application, therefore, it is advantageous to make $l$ as large as possible. Cylindrical annular beam modes having $l$ as high as 25 have been successfully produced at 3 cm wavelength.

Since the energy in the cylindrical annular mode is confined to an annulus, the entire center portion of the reflector can be removed without affecting the resonance. FIG. 5 shows a partial cross-sectional view of such an embodiment. A resonant cavity is formed by circular reflectors 30 and 32. Energy source 34 provides energy to the resonant cavity. This energy is introduced off-axis to generate a cylindrical annular resonant mode. Detector 36 senses the energy in the resonant cavity.

The reflectors 30 and 32 have their center portions removed so that the ram 40 and die 42 may be located along the axis of the resonant cavity. Since the energy is confined to an annulus surrounding ram 40 and die 42, a machine operator cannot insert his hands into the dangerous area without disturbing the resonant energy. Machine control 44 controls the punch as the function of the signal from detector 36. Whenever resonance is disturbed, punch 40 is stopped by machine control 44.

FIGS. 6a and 6b show front and cross-sectional side views of rectangular shaped reflectors which can be used to produce an essentially planar pattern of resonant energy. Rectangular reflector 50 includes input coupling iris 52 and wave energy from energy source 54 enters the resonant cavity off-axis through input coupling iris 52. Although off-axis excitation is not required to generate the rectangular modes it has been found advantageous. When the rectangular modes are used in a proximity sensor, off-axis excitation appears to improve operation of the sensor.

When the reflectors are rectangular, the distribution of energy in the midplane of the cavity is approximately $$[H_m(x\sqrt{2}/w)]^2 \ (w_0^2/w^2) \ [H_n(y\sqrt{2}/w)]^2 \ e^{-2(x^2+y^2)/\omega^2} \quad \text{(Equation 6)}$$

where $x$ and $y$ are rectangular coordinates, w is a length parameter depending on reflector geometry and the axial distance between the reflectors, and $H_n$ and $H_m$ are Hermite polynomials of order m and n respectively. The integers m and n determine the particular mode, which is denoted as $TEM_{mn}$.

One particularly useful mode is the rectangular $TEM_{m0}$ mode. This mode can result in an essentially planar distribution of resonant energy. Equation 6 can be simplified when $n = 0$, since $H_0 = 1$. The resulting energy distribution is described as $$[H_m(x\sqrt{2}/w2\ ))]^2 \ (w_0^2/w^2) \ e^{-2(x^2+y^2)/w^2} \quad \text{(Equation 7)}$$

FIG. 7a shows the distribution of energy in a resonant cavity formed by rectangular reflectors 30 and 36 for the rectangular $TEM_{80}$ mode. FIG. 7a shows the energy distribution at the beam waist. It can be seen that this energy distribution forms essentially a planar curtain of resonant energy. The curtain is formed by a plurality of energy "bundles" which are arranged side by side. The number of energy bundles equals $m + 1$. The term "planar" is used throughout to describe an energy distribution which, in its narrow dimension, is one "bundle" thick. This is approximately equal to $\sqrt{\lambda d}$, where $\lambda$ is the wavelength and d the reflector spacing.

In conclusion, high order resonant beam modes have been generated in a Fabry-Perot type of resonator. Energy is introduced into the resonant "off-axis", which allows special beam modes to be generated. The use of these beam modes has particular application to the field of proximity sensing, but may be utilized in other fields as well.

The present invention has been described with reference to a series of preferred embodiments. It will be understood, however, by workers skilled in the art that changes in form and detail may be made without departing from the spirit and scope of the invention.

The embodiments of the invention in which an exclusive property or right is claimed are defined as follows:

1. Apparatus for producing beam modes, the apparatus comprising:
   beam resonant cavity means comprising concave curved surfaces separated from one another along an axis; and
   energy source means for introducing coherent wave energy having a wavelength between about 0.1 mm and about 10 cm into the beam resonant cavity means through a position not on the axis.

2. The apparatus of claim 1 and further comprising an off-axis opening in one of the concave curved surfaces and wherein the energy source means introduces the energy into the beam resonant cavity means through said opening in one of the concave curved surfaces.

3. The apparatus of claim 1 wherein the concave curved surfaces have substantially spherical surfaces.

4. The apparatus of claim 1 wherein the wave energy is electromagnetic energy.

5. The apparatus of claim 1 wherein the wave energy is acoustic energy.

6. The apparatus of claim 1 wherein the projection of the concave surfaces on a plane perpendicular to the axis is circular.

7. The apparatus of claim 1 wherein the projection of the concave curved surfaces on a plane perpendicular to the axis is rectangular.

8. A beam mode resonator comprising:
   first and second reflector means for reflecting wave energy therebetween, said reflector means forming a resonant cavity, the first and second reflector means being separated from one another along an axis; and energy source means for introducing, into said resonant cavity formed by the first and second reflector means through a position spaced from the axis, coherent wave energy having a wavelength between about 0.1 mm and about 10 cm.

9. The beam mode resonator of claim 8 wherein the energy source means introduces energy through an off-axis opening in one of the first and second reflector means.

10. The beam mode resonator of claim 8 wherein the first and second reflector means are metal.

11. The beam mode resonator of claim 8 wherein the first and second reflector means have concave curved surfaces facing one another.

12. The beam mode resonator of claim 11 wherein the concave curved surfaces are substantially spherical surfaces.

13. The beam mode resonator of claim 8 wherein the first and second reflector means are substantially circular.

14. The beam mode resonator of claim 8 wherein the first and second reflector means are substantially rectangular.

15. The apparatus of claim 8 wherein the wave energy is electromagnetic energy.

16. The beam mode resonator of claim 8 wherein the wave energy is acoustic energy.

* * * * *